United States Patent Office 3,669,776
Patented June 13, 1972

3,669,776
NOVEL NICKEL ETCH PROCESS

Frederick Walter Eppensteiner, Southfield, Mich., assignor to M & T Chemicals Inc., New York, N.Y.

No Drawing. Filed Mar. 26, 1969, Ser. No. 810,824
Int. Cl. C23g *1/15*
U.S. Cl. 156—18 13 Claims

ABSTRACT OF THE DISCLOSURE

A method is provided for imparting decorative, light diffusing and/or non-reflective etching to nickel surfaces which includes immersing objects having clean nickel surfaces in a solution having a pH within the range of 9–12 and containing a nickel oxidant, ethylenediamine and a source of sulfate ion, for a period of time sufficient to form crystals on the nickel surfaces, withdrawing the objects with the crystal formation thereon from the solution, removing any remaining solution from the nickel surfaces, and immersing the objects in a crystal solvent to dissolve the crystals, and removing the objects with the etched nickel surfaces thereon, the pattern of the etching being substantially the same as the original crystal formation thereon. Further, solutions are provided for imparting the decorative, light diffusing and/or non-reflective etch and objects having disposed thereon decorative, light diffusing and/or non-reflective etched nickel surfaces.

Generally speaking, this invention relates to a method for imparting a textured, decorative, non-reflective and/or light diffusing surface to objects having nickel surfaces. More particularly, this invention relates to methods for imparting such etched and/or decorative and non-reflective surfaces to objects having nickel surfaces while avoiding any damage to the advantageous properties of the nickel plate itself.

With the ever increasing use of nickel surface in all phases of our economy, there is a corresponding concern with regard to its use in conjunction with areas where light diffusing and/or non-reflective surfaces are most appropriate and/or desirable such as in areas where the surfaces will be subject to sunlight and a substantial reduction in the reflective characteristics of the surfaces is desirable for purposes of, for example, reducing incidences of sun reflection into the eyes of users of such objects or to those who may be in the immediate vicinity such as, for example, surfaces around or immediately adjacent to dashboards of automobiles. In addition, there is a wide variety of applications where decorative and/or textured surfaces would be more appropriate from an aesthetic standpoint in the application of nickel surfaces in order to create differences in appearance and/or design.

However, as is well known, nickel surfaces are generally shiny in nature. If it is attempted to impart an etched or textured light diffusing surface to objects having nickel surfaces by mechanical means such as grinding and/or mechanical needle etching, certain difficulties may arise in that there may be too deep or uneven etch so as to remove too much of the nickel from surfaces plated with nickel. With such an arrangement, there may be damage to the actual plate itself, thus reducing the advantage created in the first place by having the objects nickel plated. For example, the base metal onto which the nickel plate was introduced may be exposed to oxidation damage. Further, mechanical etching or texturing may prove uneconomical from a commercial standpoint simply because the labor involved is extremely high, relatively speaking. When one considers mass produced nickel plated articles which may be incorporated in such articles as automobiles, the cost of mechanically etching some such objects becomes extremely prohibitive economically.

As is well understood, there is a plurality of chemical processes known in the art for chemically stripping nickel plate from base metal articles. However, the processes are directed mainly to removing imperfect plated surfaces which for one reason or another were not properly plated in the first place and because of the relative value of the base metal article to which the nickel plate has been affixed, it is economically feasible to remove the imperfect plated surfaces for replating them with properly plated surfaces. However, since these processes are directed to removal of substantially all of the nickel plate from the base metal articles, they are not satisfactory for removing only small portions of the nickel plate in a serrated, textured or etched pattern for providing a final decorative, light diffusing and/or non-reflective nickel surface.

Thus, the problem arises where in order to impart decorative and/or non-reflective etching to nickel plated surfaces, mechanical means must be used for removing only a small part of the actual nickel plate while at the same time not causing any substantial change to the plated surfaces to the extent where the plate would no longer provide the enhanced protective coating for the base metal article to which the plate has been affixed in the first place. The further use of mechanical means for solid nickel objects may be effective for certain applications, but such mechanical processes may be economically prohibitive for mass production operations in which many thousands of the same type article may be produced in a single production run.

On the other hand, those chemical processes known in the prior art which may provide economically satisfactory operations have proved unsatisfactory in that no substantial control can be made of the nickel removal so as to produce only a textured and/or non-reflective nickel plated surface as a final product, but rather remove unsatisfactorily large amounts of the nickel plate from the base metal article.

By contrast, and quite unexpectedly, it has now been found in accordance with this invention, a method for imparting a decorative, light diffusing, and/or non-reflective etching to nickel surfaces in a two-step process which requires the formation of first a crystalline coating on nickel-surfaced objects in a chemical bath, with the subsequent removal of the coating in a solvent bath to produce an etched pattern. The first step is accomplished by forming a nickel ethylenediamine sulfate crystal on the work in situ. This is achieved by using a nickel oxidant in combination with ethylenediamine and sulfate ion. Objects having clean nickel surfaces are immersed in a solution having a specific pH range and containing a nickel oxidant, ethylenediamine and a source of sulfate ion for a period of time sufficient to form the crystals of nickel ethylenediamine sulfate, withdrawing the objects with the crystal formation thereon from the solution, removing any remaining solution from the nickel surfaces, and immersing the objects in a solvent to dissolve the crystals.

With such an arrangement, nickel-surfaced objects are achieved having the appropriate and desirable etched pattern thereon with the etched pattern being substantially the same as the original crystal formation which was formulated in a solution noted above and with removal of the original plate on those objects avoiding substantial change in the properties thereof, and further, most importantly, without any substantial effect on the nickel plate in its protective role as covering the original base metal article. It should be understood, however, that allowing nickel-*plated* objects to be immersed in the etching solutions for periods substantially longer than is taught, in accordance herewith, may cause damage to those objects merely because the depth of the etch may proceed clear through the plate. If plated objects are to be etched in accordance herewith, it is a simple matter to calculate the depth of the etch desired and then to select a plate depth of sufficient width to accommodate the etch desired without sacrificing any of the protective qualities of the plate on the base metal.

Accordingly, it is one object of this invention to produce decorative, light diffusing, and/or non-reflective nickel-surfaced objects which have disposed in the surfaces thereof an appropriate textured and/or etched pattern. It is a further object of this invention to provide a method for imparting decorative, light diffusing, and/or non-reflective etching to nickel-plated surfaces in the absence of substantial change in the properties of the nickel coating in the first place.

It is a still further object of this invention to produce chemical solutions which are capable of imparting satisfactory etched nickel surfaces, and finally, it is an object of this invention to produce such satisfactory etched, textured, light diffusing, and/or non-reflective nickel-surfaced objects by a method which is economically appropriate for mass production techniques.

With the foregoing and additional objects in view, this invention will be described in more detail and other objects and advantages will be apparent from the following description and the appended claims.

Before describing this invention in more detail, it may be well to note that this invention has been found applicable to a wide variety of nickel-surfaced objects having a plurality of different configurations simply because the etching achieved in accordance herewith is done in a chemical manner by immersing the objects in solution so that however intricate the configuration of the object in the first place it can be satisfactorily etched and/or textured over the entire surface thereof or those surfaces upon which such texture and/or etched pattern is desired.

For example, satisfactory results have been achieved in accordance herewith, and under satisfactorily and economically attractive conditions on commercial scale operations with chemical solutions formed by admixing ethylenediamine within the range of 50–250 ml./l., any convenient source of sulfate ion including the alkali metal sulfates and bisulfates, sulfuric acid, ammonium sulfate and ammonium bisulfate within the range of between about 10–145 g./l. of sulfate ion, and any convenient form of nickel oxidant including chemical oxidants such as nitro aromatic compounds and their alkali metal salts, sodium nitrobenzoate, sodium nitrophenolate, o-, m-, p-nitrobenzoic acid and mixtures thereof, o-, m-, p-nitrobenzene sulfonic acids and mixtures thereof, o-, m-, p-nitrophenols and mixtures thereof, nitroparaffins such as nitropropane, inorganic oxidants such as sodium and potassium bromates, iodates and periodates, and ammonium persulfate.

These chemical oxidants are admixed in the solution in the range of between about 3 g./l. to the upper limit of solubility depending upon temperature and the concentration of the other ingredients. It is to be understood, however, that electrolytic oxidation is a convenient and satisfactory source of nickel oxidation in accordance herewith, depending upon the circumstances and the conditions of operation.

The nickel-surfaced objects are then immersed in the solution for a period of time sufficient to form the nickel ethylenediamine sulfate crystals thereon, removing the objects from the crystal-forming solution, and removing any remaining solution from the nickel surfaces, and thereafter immersing the objects in a crystal solvent to dissolve the crystals. The solvents may be acid solvents such as sulfuric, nitric, acetic, sulfamic, fluoboric, phosphoric or hydrochloric, as well as sodium cyanide and potassium cyanide, for example, in a variety of strengths depending upon which solvent is used and the conditions of operation. The resulting product has disposed thereon a decorative etched pattern with the etching being substantially the same as the previous crystal formation and with little removal of the nickel and/or little removal of protective nickel plate from base metal articles so plated.

In considering generally the conditions for achieving the most enhanced results in connection herewith, which conditions are more specifically set forth below, one may note that satisfactory etched surfaces are achieved in accordance herewith when the crystal forming solution is maintained at a temperature within the range of between about ambient to 99° C. (or boiling) and a pH within the range of between about 9–12.

It has been found that the most satisfactory results are achieved in accordance herewith if the nickel-surfaced objects to be etched are first thoroughly cleaned probably because soil impurities and oxides which may accumulate on old nickel plated surfaces may interfere with the proper chemical interaction in the etching solution. Therefore, it has been found especially preferred that the etching achieved in accordance herewith be applied to newly plated nickel surfaces, although it is to be understood that satisfactory results are achieved as long as the plated surfaces have been appropriately cleaned and activated prior to immersion of the plated objects in the etching solution.

Accordingly, it has been found that satisfactory results are achieved in accordance herewith in a typical flow pattern including, for example, first taking a clean steel panel, applying, as well known, nickel plate to the steel panel for 20 minutes at 60 a.s.f. (amperes per square foot), rinsing the panel with clear water, immersing the panel in an etching solution in accordance herewith for 10 minutes, removing the etched panel from the etching solution and rinsing with clear water, immersing the panel in a solvent for thirty seconds, immersing the panel in a cold water rinse and then a hot water rinse and then drying. It should be understood, further, that etched plated objects produced in accordance herewith may be further processed with chromium and/or other electroplates as desired and as well known in the art of nickel plating generally.

A preferred cycle of operation in accordance herewith for formulating the particular etched and/or non-reflective nickel surfaces includes first formulating the etching solution by admixing between about 50–250 ml./l. of ethylenediamine, and preferably 100 ml./l., 14.8–215 g./l. sodium sulfate, and preferably 40 g./l., and 5 g./l. to the upper limit of solubility depending upon temperature and the concentration of the other ingredients, and preferably 25 g./l. of p-nitrobenzoic acid. As an alternative oxidant of equal value in practising the preferred cycle in accordance herewith, potassium iodate is used as providing satisfactory results and generally in the range noted for p-nitrobenzoic acid, and with a preferred range of 3 g./l. to saturation. The admixture is maintained at a temperature between about ambient to 99° C., and preferably 60° C. The pH of the etching solution is within the range of 9–12, and preferably 10.5. Thereafter, newly plated nickel-surfaced objects and/or thoroughly cleaned nickel-surfaced objects are immersed in the etching solution for a period of time of between about 5 minutes and 2 hours depending upon various factors including the degree of etch desired and the age of the etching solution, and usually for about 15 minutes.

A crystalline pattern is produced over the entire surface of the nickel-surfaced objects immersed in the etching solution and thereafter the objects are removed from the etching solution and rinsed with cold water. Thereafter, the objects are immersed in any crystal-dissolving solution, and preferably a 50% hydrochloric acid pickle, and remain in the solution for a period of time necessary to dissolve the crystals thereon, and preferably for about thirty seconds in order to dissolve the crystal formation. Thereafter, the objects are removed from the dissolving solution and washed first with cold water and then with hot water and then dried. The nickel-surfaced objects have formed thereon an etched and/or textured pattern over the entire surface thereof with the formation of the pattern being the same as the original crystalline formation on the objects as they were removed from the etching solution.

It is to be understood that the novel etching solutions produced in accordance herewith have a satisfactory etching life. It has been found that satisfactory results are achieved with the solutions formulated in accordance herewith over an extended period of time. However, it has been found that after an extended period of time, the crystalline formation becomes much slower and longer immersion times have provided satisfactory results up to and including two hours. In this connection, it has been found that the pH range of between about 9–12 is most satisfactory with a pH range much above 12 not producing as satisfactorily etched surfaces. However, it has been found that the life of the etching solutions in accordance herewith can be increased after the pH level reaches substantially about 12.5 by the addition of small amounts of sulfuric acid and boric acid which lower the pH level down to about 11 and restores the effectiveness of the bath. It is to be understood further that multi-etched patterns can be achieved, in accordance herewith, merely by repeating the application of the process taught herein to nickel-surfaced objects.

As purely illustrative of the enhanced results achieved in accordance herewith, one may note the following examples in which a plurality of clean steel panels were first nickel plated and then etched with the novel nickel etching solution in accordance herewith. The results achieved were aesthetically attractive, etched nickel-plated panels having low reflective qualities for light diffusing finishes. It is to be understood, however, that these examples are being presented with the understanding that they are to have no limiting character on the broad disclosure of the invention as generally set forth herein and as directed to men skilled in the art.

EXAMPLE 1

A clean steel panel was electroplated in a bright nickel bath to a thickness of 0.001 inch, that is, approximately 20 minutes at 60 a.s.f. (amperes per square foot). The panel was then immersed in a nickel etching solution, in accordance herewith, containing 100 ml./l. ethylenediamine, 40 g./l. sodium sulfate and 25 g./l. p-nitrobenzoic acid with the solution having a pH of 11 and the temperature being substantially about 60° C. The etching solution was then seeded with about 5 g./l. nickel sulfate. The purpose of the seeding is to saturate the solution with nickel ethylenediamine sulfate prior to etching panels so as to avoid stripping of nickel from the work until saturation is reached. After about 5 minutes, the panel was covered with purple needle-like crystals. However, in order to insure a thorough etching, the panel was left in for an additional ten minutes. Thereafter, the panel was taken out and rinsed in water and immersed in a 50% hydrochloric acid pickle for a period of time sufficient to remove the crystals from the panel. At this stage, the panel was removed from the acid pickle and rinsed and dried. The result was a nickel plated steel panel having formed over the surface thereof a novel crystalline etch pattern having great eye-appeal and low reflectance for light diffusing applications.

In order to provide information as to the results achieved by further post plating after the etching process, in accordance herewith, the pattern on the panel was enhanced by flashing in bright nickel for two minutes at 60 a.s.f., as well known, followed by plating with chromium for 2.5 minutes at 150 a.s.f.

EXAMPLE 2

A 2 liter etching solution was prepared by admixing 1 liter of water, 200 ml. of 98% ethylenediamine, 50 grams of p-nitrobenzoic acid, and 80 grams of sodium sulfate with the volume being adjusted to 2 liters. The pH was tested electrometrically at 11.0. In this example, old nickel-plate panels were used instead of freshly plated panels thus requiring preliminary cleaning procedures. The temperature was raised to 60° C. and 4" x 6" preplated nickel panels were prepared by scrubbing with Ajax for 1 minute, cathodic cleaned for 1 minute and immersed in HCl pickle for 30 seconds. These panels were then immersed in the etching solution for 10 minutes and then washed, and the resulting crystal formation was dissolved by immersing the panels in a 50% hydrochloric acid pickle for a time sufficient to dissolve the crystals. The resulting panels had disposed over the entire surface thereof a satisfactory and eye-appealing etched pattern.

EXAMPLE 3

A 2 liter etching solution was prepared by admixing one liter of water, 200 ml. of 98% ethylenediamine, 50 grams of mixed isomers of o, m, nitrobenzoic acid and 80 grams of sodium sulfate. The volume of the solution was adjusted to a two liter volume. The pH was determined electrometrically to be 11.0. The temperature of the etching solution was raised to 60° C. and nickel plated panels were prepared in the same manner as in Example 2 noted above. The prepared nickel plated panels were immersed in the etching solution for 10 minutes during which time crystals formed over the entire surface thereof. The panels were then removed from the etching solution and washed with water and immersed in a 50% hydrochloric acid pickle for a time sufficient to dissolve the crystals. The panels were then removed from the pickle and washed with cold water and then hot water and dried. The resulting etched panels had imparted over the surfaces thereof a clearly defined etched pattern substantially similar to the pattern on the panels from Example 2 noted above. The pattern was the same as the crystal formation originally formed over the surface of the panels. However, the etching was not as clearly defined as on the panels etched from the solution of Example 2, indicating that p-nitrobenzoic acid is a more satisfactory oxidant for the purposes of carrying out this invention than the nitrobenzoic acid isomers of this example.

Accordingly, and as will be apparent from the foregoing, there are provided in accordance herewith, methods and compositions for imparting decorative and/or non-reflective etching to nickel surfaces disposed on a wide variety of objects of different configuration useful for a plurality of applications while still avoiding and/or causing any substantial change to the advantageous properties of the nickel surface, or to nickel plated surfaces for the purposes for which it was formed on the surface of the articles in the first place. Further, because of the relative ease of operation in accordance herewith in which objects are immersed in a liquid solution so as to easily impart etching to even those objects of intricate configuration and because the ingredients used for formulating the compositions in accordance herewith are relatively inexpensive, the objects produced in accordance herewith are highly advantageous commercially, and even in mass production operations.

While the methods and compositions herein disclosed form preferred embodiments of this invention, this invention is not limited to those specific methods and compositions, and changes can be made therein without departing from the scope of this invention which is defined in the appended claims.

What is claimed is:

1. In a method for imparting decorative and non-reflective etching to objects having nickel surfaces disposed thereon, the steps which comprise immersing said nickel-surfaced objects in an etching solution having a pH within the range of between about 9–12 and containing a nickel oxidant, ethylenediamine, and a source of sulfate ion for a period of time within the range of between about 5 minutes and 2 hours to form a crystalline nickel ethylenediamine sulfate coating on the nickel surfaces, withdrawing the crystalline nickel ethylenediamine sulfate coated objects from said solution, removing any remaining solution from said objects, dissolving said crystalline nickel ethylenediamine sulfate coating by immersing said objects in a crystal solvent solution consisting essentially of a member selected from the group consisting of sulfuric acid, hydrochloric acid, acetic acid, sulfamic acid, fluoboric acid, phosphoric acid, nitric acid, potassium cyanide and sodium cyanide, removing said objects from said solvent solution, and removing the remaining said solvent solution from said objects.

2. A method as described in claim 1 in which the temperature of said etching solution is between about ambient to 99° C.

3. A method as described in claim 1 in which said source of sulfate ion is selected from the group consisting of sodium sulfate, the alkali metal sulfates, the alkali metal bisulfates, sulfuric acid, ammonium sulfate, ammonium bisulfate, and mixtures thereof.

4. A method as described in claim 1 in which said nickel oxidant is selected from the group consisting of o-nitrobenzoic acid, m-nitrobenzoic acid, p-nitrobenzoic acid and mixtures thereof; o-nitrobenzenesulfonic acid, m-nitrobenzenesulfonic acid, p-nitrobenzenesulfonic acid and mixtures thereof; o-nitrophenol, m-nitrophenol, p-nitrophenol, and mixtures thereof; nitroparaffins, sodium bromate, potassium bromate, sodium iodate, potassium iodate, sodium periodate, potassium periodate, sodium nitrobenzoate, sodium nitrophenolate, and ammonium persulfate.

5. A method as described in claim 1 in which said nickel oxidant is electrolytic oxidation.

6. A method as described in claim 1 in which said source of sulfate ion is sodium sulfate present in said etching solution in an amount between about 14.8–215 g./l.

7. A method as described in claim 6 in which said nickel oxidant is p-nitrobenzoic acid present in said etching solution in an amount between about 5 g./l. and the upper limit of solubility.

8. A method as described in claim 6 in which said nickel oxidant is potassium iodate present in said etching solution in an amount between about 3 g./l. and the upper limit of solubility.

9. A method as described in claim 7 in which said ethylenediamine is present in said etching solution in an amount between about 50–250 ml./l.

10. A method as described in claim 9 in which said sodium sulfate is present in the amount of about 40 g./l., said p-nitrobenzoic acid is present in the amount of about 25 g./l. and said ethylenediamine is present in the amount of about 100 ml./l.

11. A method as described in claim 8 in which said sodium sulfate is present in the amount of about 40 g./l., said potassium iodate is present in the amount of about 25 g./l. and said ethylenediamine is present in the amount of about 100 ml./l.

12. A method as described in claim 10 in which the pH of said etching solution is about 10.5 and the temperature thereof is about 60° C.

13. A method as described in claim 1 in which said dissolving step is carried out for about 30 seconds and in which said two removing steps are carried out with cold water.

References Cited

UNITED STATES PATENTS

| | | | |
|---|---|---|---|
| 3,000,829 | 9/1961 | Arden | 134—27 |
| 3,163,524 | 12/1964 | Weisberg et al. | 75—119 |
| 3,351,556 | 11/1967 | Tsourmas | 252—103 |
| 3,399,143 | 8/1968 | Slominski | 252—79.2 |
| 3,365,401 | 1/1968 | Saubestre et al. | 156—18 |

OTHER REFERENCES

Fernsler: "Cleaning and Finishing of Nickel and Nickel Alloys," pp. 661, 663, in Metals Handbook, vol. 3, 1964.

Missel et al.: "Chemical Milling of Nickel Matrices," pp. 1076–1078, published in Plating, October 1962.

ROBERT F. BURNETT, Primary Examiner

R. J. ROCHE, Assistant Examiner

U.S. Cl. X.R.

134—2, 26; 204—145; 252—79.1, 79.4